US010756587B2

(12) United States Patent
Tachikawa et al.

(10) Patent No.: US 10,756,587 B2
(45) Date of Patent: Aug. 25, 2020

(54) POLYPHASE AC ELECTRIC MOTOR

(71) Applicants: FURUKAWA ELECTRIC CO., LTD., Tokyo (JP); Furukawa Magnet Wire Co., Ltd., Tokyo (JP)

(72) Inventors: Eigo Tachikawa, Tokyo (JP); Tsuneo Aoi, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 337 days.

(21) Appl. No.: 15/706,420

(22) Filed: Sep. 15, 2017

(65) Prior Publication Data
US 2018/0006516 A1 Jan. 4, 2018

Related U.S. Application Data

(63) Continuation of application No. PCT/JP2016/058206, filed on Mar. 15, 2016.

(30) Foreign Application Priority Data

Mar. 19, 2015 (JP) ................. 2015-056997

(51) Int. Cl.
H02K 3/12 (2006.01)
H02K 3/28 (2006.01)
(Continued)

(52) U.S. Cl.
CPC .............. H02K 3/12 (2013.01); H02K 1/165 (2013.01); H02K 1/2786 (2013.01); H02K 3/28 (2013.01);
(Continued)

(58) Field of Classification Search
CPC .. H02K 3/28; H02K 3/30; H02K 3/32; H02K 3/34; H02K 3/40
(Continued)

(56) References Cited

U.S. PATENT DOCUMENTS 7,781,933 B2   8/2010 Koide et al.
2009/0134737 A1* 5/2009 Maekawa ............... H02K 3/12
                                                     310/207
(Continued)

FOREIGN PATENT DOCUMENTS

JP   2004112890    4/2004
JP   2007267526   10/2007
(Continued)

OTHER PUBLICATIONS

International Search Report for PCT Application No. PCT/JP2016/058206, dated Jun. 21, 2016, 4 pages.
(Continued)

Primary Examiner — Quyen P Leung
Assistant Examiner — Alexander Moraza
(74) Attorney, Agent, or Firm — Amin, Turocy & Watson, LLP

(57) ABSTRACT

Object: To provide a polyphase AC electric motor whereby partial discharge can be suppressed.
Resolution Means: The winding of each phase includes a first partial conductor that is an input side partial conductor; an nth partial conductor connected to a neutral point; and second to n-1th partial conductors. Moreover, a partial conductor disposed within the stator adjacent to the first partial conductor of each phase, or a partial conductor including a coil end portion disposed adjacent to a coil end portion where the first partial conductor extends out of the slot, is any of the following:
(1) of the intermediate partial conductors, an ath (where a is a natural number greater than or equal to 2) partial conductor of the same phase or a different phase where voltage takes an extreme value when AC voltage is applied from the inverter;
(2) any of an a-3th to a-1th partial conductors of the same phase or a different phase, or any of an a+1th to a+3th partial (Continued)

conductors of the same phase or a different phase connected to the intermediate partial conductor taking the extreme value;

(3) any of a n-3th to nth partial conductors of the same phase or a different phase.

8 Claims, 11 Drawing Sheets

(51) Int. Cl.
*H02K 3/34* (2006.01)
*H02K 1/16* (2006.01)
*H02K 1/27* (2006.01)
*H02K 3/30* (2006.01)
*H02K 21/12* (2006.01)

(52) U.S. Cl.
CPC ............... *H02K 3/30* (2013.01); *H02K 3/34* (2013.01); *H02K 21/12* (2013.01); *H02K 1/276* (2013.01)

(58) Field of Classification Search
USPC .................................................. 310/179–210
See application file for complete search history.

(56) References Cited

U.S. PATENT DOCUMENTS

| | | | |
|---|---|---|---|
| 2012/0181886 A1* | 7/2012 | Osada | H02K 3/14 310/71 |
| 2015/0244227 A1* | 8/2015 | Wakimoto | H02K 3/28 310/208 |

FOREIGN PATENT DOCUMENTS

| | | |
|---|---|---|
| JP | 2008035580 | 2/2008 |
| JP | 2009278845 | 11/2009 |
| JP | 2012016195 A | 1/2012 |
| JP | 2012175822 | 9/2012 |
| JP | 2012210094 | 10/2012 |
| JP | 2013207972 A | 10/2013 |

OTHER PUBLICATIONS

Supplementary EP Search Report for EP Application No. 16764984.7 dated Mar. 8, 2018, 9 pages.

* cited by examiner

| | | U PHASE INPUT | | | | V PHASE INPUT | | | | W PHASE INPUT | | | |
|---|---|---|---|---|---|---|---|---|---|---|---|---|---|
| | | 1 | 2 | 3 | 4 | 5 | 6 | 7 | 8 | 9 | 10 | 11 | 12 |
| 12 | | U1 | U13 | U25 | U37 | V1 | V13 | V25 | V37 | W1 | W13 | W25 | W37 |
| 11 | | V26 | V38 | W2 | W14 | W26 | W38 | U2 | U14 | U26 | U38 | V2 | V14 |
| 10 | | U3 | U15 | U27 | U39 | V3 | V15 | V27 | V39 | W3 | W15 | W27 | W39 |
| 9 | | V28 | V40 | W4 | W16 | W28 | W40 | U4 | U16 | U28 | U40 | V4 | V16 |
| 8 | | U5 | U17 | U29 | U41 | V5 | V17 | V29 | V41 | W5 | W17 | W29 | W41 |
| 7 | | V30 | V42 | W6 | W18 | W30 | W42 | U6 | U18 | U30 | U42 | V6 | V18 |
| 6 | | U7 | U19 | U31 | U43 | V7 | V19 | V31 | V43 | W7 | W19 | W31 | W43 |
| 5 | | V32 | V44 | W8 | W20 | W32 | W44 | U8 | U20 | U32 | U44 | V8 | V20 |
| 4 | | U9 | U21 | U33 | U45 | V9 | V21 | V33 | V45 | W9 | W21 | W33 | W45 |
| 3 | | V34 | V46 | W10 | W22 | W34 | W46 | U10 | U22 | U34 | U46 | V10 | V22 |
| 2 | | U11 | U23 | U35 | U47 | V11 | V23 | V35 | V47 | W11 | W23 | W35 | W47 |
| 1 | | V36 | V48 | W12 | W24 | W36 | W48 | U12 | U24 | U36 | U48 | V12 | V24 |
| | | V PHASE NEUTRAL POINT | | | | W PHASE NEUTRAL POINT | | | | U PHASE NEUTRAL POINT | | | |

FIG. 9

| | 1 | 2 | 3 | 4 | 5 | 6 | 7 | 8 | 9 | 10 | 11 | 12 |
|---|---|---|---|---|---|---|---|---|---|---|---|---|
| | U PHASE INPUT | | | | | | V PHASE INPUT | | | | | W PHASE INPUT |
| 12 | U1 | U13 | U25 | U37 | V37 | V25 | V13 | V1 | W12 | W24 | W36 | W48 |
| 11 | V14 | V2 | W11 | W23 | W35 | W47 | U2 | U14 | U26 | U38 | W38 | V26 |
| 10 | U3 | U15 | U27 | U39 | V39 | V27 | V15 | V3 | W10 | W22 | W34 | W46 |
| 9 | V16 | V4 | W9 | W21 | W33 | W45 | U4 | U16 | U28 | U40 | W40 | V28 |
| 8 | U5 | U17 | U29 | U41 | V41 | V29 | V17 | V5 | W8 | W20 | W32 | W44 |
| 7 | V18 | V6 | W7 | W19 | W31 | W43 | U6 | U18 | U30 | U42 | W42 | V30 |
| 6 | U7 | U19 | U31 | U43 | V43 | V31 | V19 | V7 | W6 | W18 | W30 | W42 |
| 5 | V20 | V8 | W5 | W17 | W29 | W41 | U8 | U20 | U32 | U44 | W44 | V32 |
| 4 | U9 | U21 | U33 | U45 | V45 | V33 | V21 | V9 | W4 | W16 | W28 | W40 |
| 3 | V22 | V10 | W3 | W15 | W27 | W39 | U10 | U22 | U34 | U46 | W46 | V34 |
| 2 | U11 | U23 | U35 | U47 | V47 | V35 | V23 | V11 | W2 | W14 | W26 | W38 |
| 1 | V24 | V12 | W1 | W13 | W25 | W37 | U12 | U24 | U36 | U48 | V48 | V36 |
| | | W PHASE NEUTRAL POINT | | | | | | | | U PHASE NEUTRAL POINT | V PHASE NEUTRAL POINT | |

POLYPHASE AC ELECTRIC MOTOR

CROSS-REFERENCE TO RELATED APPLICATIONS

The subject application is a continuation of, and claims priority to, PCT application Ser. No. PCT/JP2016/058206, filed Mar. 15, 2016, and entitled "POLYPHASE AC ELECTRIC MOTOR", which claims priority to Japanese Patent Application Serial No. 2015-056997, filed Mar. 19, 2015, which applications are hereby incorporated herein by reference in their respective entireties.

TECHNICAL FIELD

The present invention relates to a polyphase AC electric motor.

BACKGROUND ART

In electric motors used in automobiles, windings are housed in slots provided in an annular stator core (stator), and have a shape in which portions of the windings protrude from the stator into coil end portions that are outward in an axial direction.

In recent years, a demand has arisen to mount an electric motor without changing the volume of the engine room of the automobile. As such, there is a need to both miniaturize the electric motor, including the coil end portions, and also increase the output of the electric motor. If the length of the coil end portions is shortened so as to reduce the distance between adjacent conductors as much as possible to meet these needs, there will be an extremely high voltage difference between the conductors, which will lead to the occurrence of partial discharge and, as a result, insulation performance deteriorates.

An example of an electric motor in actual use is given to explain insulation performance deterioration caused by partial discharge. When an electric motor is in actual use, potential differences caused by drops in voltage occur between coils of the same phase that are electrically connected in series. Particularly, with stators in which coils of a plurality of phases have a star connection arrangement, the coils of the plurality of phases are connected by neutral points and current is input from the input terminal side of each phase. As such, depending on switching operations of the inverter, voltage may become concentrated in specific coils of each phase near each input terminal side due to the generation of steep surge voltage, which is higher than the voltage when driving with normal AC current, and the shared voltage of specific coils may increase. Particularly, in recent years, high speed switching has been investigated to reduce loss in inverters and, as a result, increased surge voltage and higher frequencies have become more common. Here, in cases where a specific coil and another coil other than the specific coil are connected within the same slot, and also in cases where the coil end portions of these coils are near each other, the potential difference between the adjacent coils increases due to the effects of the surge voltage. Moreover, in cases where the potential difference between the adjacent coils exceeds the Partial Discharge Inception Voltage (PDIV), partial discharge occurs between the coils, which leads to deterioration of the insulating portions between the coils. In other words, the insulation life of the coils may be shortened.

To solve this problem, providing insulating paper in the slots and partitioning the plurality of coils using the insulating paper has been considered. However, in such a method, the coil space factor within the slots declines and the length of the slots increases, which leads to an increase in the size of the electric motor. Additionally, if insulating paper is inserted into the slots, space referred to as "slot tip clearance", which is provided at the inner end portion in the radial direction of the stator within the slots, may decrease, and copper vortex loss may increase. In this case, the loss of the electric motor may increase, resulting in a decrease in the fuel economy of hybrid vehicles and similar vehicles that use electric motors as motors for running or the like; loss may increase at portions of the coils that include portions disposed on the innermost peripheral portion of the slots, resulting in increases in coil temperature; or the like.

On the other hand, configuring all of the coils, including an entirety of an insulating layer provided around the periphery of the in-slot components, from an insulating layer having a dielectric constant that is lower than that of conventionally used insulating layers has also been considered. However, with such a method, the manufacturing cost of the stator may increase.

As such, in order to solve these problems, Patent Document 1 describes a technique to reduce the potential difference between coils of the same phase and coils of different phases and improve insulating performance. Specifically, Patent Document 1 describes a method of housing coils in slots such that input/output terminal side coils of the same phase and neutral point side coils where potential is high are adjacent within each phase slot, and input/output terminal side coils where potential is high and neutral point side coils where potential is low of different phases are adjacent outside the slots. In this method, of the plurality of partial coils forming the coils of each phase, inside-slot conductor portions of coils connected to the input/output terminal side where potential is high are housed in slots other than slots existing at circumferential end positions of each phase slot group.

Additionally, Patent Document 2 describes a technique to reduce voltage between coils. Specifically, Patent Document 2 describes housing a coil that has a first insulating layer with a first dielectric constant in a reference slot; and housing an input terminal side coil where potential is highest, which is provided with a layer with a second dielectric constant lower than the first dielectric constant, in a slot other than the reference slot.

CITATION LIST

Patent Literature

Patent Document 1: Japanese Unexamined Patent Application Publication No. 2004-112890A
Patent Document 2: Japanese Unexamined Patent Application Publication No. 2012-175822A

SUMMARY OF INVENTION

Technical Problem

However, in recent years, as described above, high speed switching has been investigated to reduce loss in inverters and, as a result, increased surge voltage and higher frequencies have become more common.

In general, it is understood that, compared to the sinusoidal voltage of commercial frequencies, the harmonic components contained in the waveforms of inverter surge voltage span a broad band of several tens of MHz. When a surge containing such harmonics is applied, the voltage distribution within the coil becomes more complex than when voltage of frequencies of several tens of kHz are applied such as with commercial frequencies and carrier frequencies of inverters. As such, it is clear that the configuration described in Patent Document 1, in which voltage is lowered by simply arranging the input/output terminal side coils where the potential is highest adjacent to the neutral point potential input/output terminal side coils where the potential is lowest, is not optimal as a method of housing coils in slots for cases where high frequency surges are applied. Additionally, this configuration leads to the occurrence of large voltage differences between parts of the conductors. Moreover, with the configuration described in Patent Document 2, the layer material is different for a portion of the coil and, as such, there are problems such as the manufacturing method becoming complicated, and costs increasing due to the low dielectric constant layer being needed.

In light of the foregoing, an object of the present invention is to provide a polyphase AC electric motor whereby characteristics of the potential distribution in the coil at high frequencies can be utilized, and voltage between coils of the same phase or coils of different phases can be reduced, partial discharge can be suppressed, and manufacturing can be facilitated without reducing the space factor, even in cases where an inverter surge, which contains harmonics caused by higher frequencies resulting from high speed inverter switching, is applied to the input terminal.

Solution to Problem

A polyphase AC electric motor that solves the problems described above includes a stator in which windings of different phases are distribution wound and star-connected, and the polyphase AC electric motor is driven by an inverter. In such a polyphase AC electric motor, the winding of each phase includes a first partial conductor that is an input side partial conductor connected to an input terminal; an nth (where n is a natural number greater than or equal to 2) partial conductor that is a final partial conductor connected to a neutral point; and second to n−1th partial conductors that are intermediate partial conductors connected between the first partial conductor and the nth partial conductor. Moreover, a partial conductor disposed adjacent to the first partial conductor of each phase within the stator, or a partial conductor including a coil end portion disposed adjacent to a coil end portion where the first partial conductor extends out of the slot, corresponds to a partial conductor described in any of (1) to (3) below:

(1) of the intermediate partial conductors, an ath (where a is a natural number greater than or equal to 2) partial conductor of the same phase or a different phase where voltage takes an extreme value when AC voltage is applied from the inverter;
(2) any of an a−3th to a−1th partial conductors of the same phase or a different phase, or any of an a+1th to a+3th partial conductors of the same phase or a different phase connected to the intermediate partial conductor taking the extreme value;
(3) any of a n−3th to nth partial conductor of the same phase or a different phase. With such a configuration, a polyphase AC electric motor can be provided whereby characteristics of the potential distribution in the coil at high frequencies can be utilized and voltage between coils of the same phase or coils of different phases can be reduced, partial discharge can be suppressed, and manufacturing can be facilitated without reducing the space factor, even in cases where an inverter surge, which contains harmonics caused by higher frequencies resulting from high speed inverter switching, is applied to the input terminal.

According to the present invention, a partial conductor disposed adjacent within the stator to the second partial conductor or the third partial conductor of each phase, or a partial conductor including a coil end portion disposed adjacent to a coil end portion where the first partial conductor or the third partial conductor extends out of the slot corresponds to a partial conductor described in any of (1) to (3) above.

With such a configuration, partial discharge can also be suppressed for the second partial conductor and the third partial conductor where voltage is higher after the first partial conductor.

According to the present invention, the partial conductor that takes the extreme value is a bth (where b is a natural number greater than or equal to 2) partial conductor of the same phase or a different phase adjacent in a circumferential direction of the stator to a slot end in which the first partial conductor of each layer is housed; any of a b−3th to b−1th partial conductor connected before or after the partial conductor; or any of a b+1th to b+3th partial conductor connected to the partial conductor.

With such a configuration, the arrangement of the partial conductors in the slots can be facilitated.

According to the present invention, the first partial conductor of at least one phase of the first partial conductors of the plurality of phases is disposed at a first end portion in a radial direction of the stator; and the first partial conductors of the other phases are disposed at a second end portion in the radial direction of the stator.

With such a configuration, the arrangement of the partial conductors in the slots can be facilitated.

According to the present invention, winding directions, with respect to the circumferential direction of the stator, of the windings of different phases are all the same direction.

With such a configuration, the arrangement of the partial conductors in the slots can be facilitated.

According to the present invention, at least one winding direction, with respect to the circumferential direction of the stator, of the windings of different phases is an opposite direction.

With such a configuration, the arrangement of the partial conductors in the slots can be facilitated.

According to the present invention, a partial conductor including a coil end portion disposed adjacent to a coil end portion where the first partial conductor extends out of the slot corresponds to a partial conductor described in any of (1) to (3) below:

(1) a bth (where b is a natural number greater than or equal to 2) partial conductor of the same phase or a different phase adjacent in a circumferential direction of the stator to a slot end in which the first partial conductor of each layer is housed;
(2) a b−1th partial conductor or a b+1th partial conductor connected before or after the bth partial conductor;
(3) any of a n−1th to nth partial conductor of the same phase or a different phase. With such a configuration, the arrangement of the partial conductors in the slots can be facilitated.

Advantageous Effects of Invention

According to the present invention, it is possible to provide a polyphase AC electric motor whereby characteristics of the potential distribution in the coil at high frequencies can be utilized and voltage between coils of the same phase or coils of different phases can be reduced, partial discharge can be suppressed, and manufacturing can be facilitated without reducing the space factor, even in cases where an inverter surge, which contains harmonics caused by higher frequencies resulting from high speed inverter switching, is applied to the input terminals.

BRIEF DESCRIPTION OF DRAWINGS

FIG. 3 is a table showing housing modes of partial conductors housed in the slots illustrated in FIG. 1.

FIG. 5 is a table showing a convention housing mode of partial conductors in the ¼ model illustrated in FIG. 4.

FIG. 9 is a table showing a housing mode of partial conductors according to the embodiment of the present invention in the ¼ model illustrated in FIG. 4.

DESCRIPTION OF EMBODIMENT

An embodiment of the present invention is described below.

(A) Description of the Embodiment of the Present Invention

Figure 1:
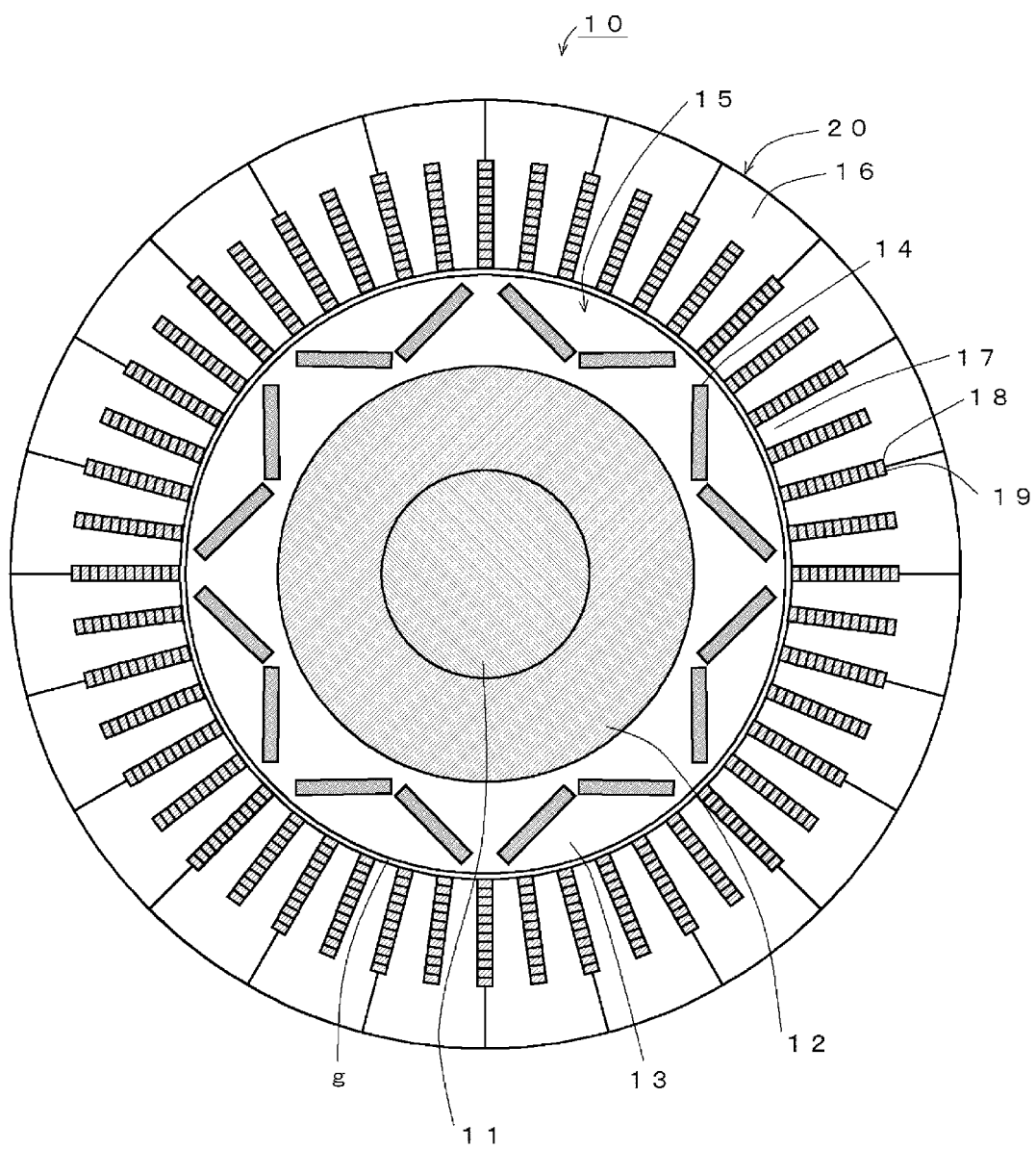
FIG. 1 is a drawing illustrating an example of a configuration of a polyphase AC electric motor according to an embodiment of the present invention.

FIG. 1 is a drawing illustrating an example of a configuration of a polyphase AC electric motor according to an embodiment of the present invention. As illustrated in FIG. 1, a polyphase AC electric motor 10 according to the embodiment of the present invention includes a stator 20 formed in a substantially cylindrical shape, and a rotor 15 housed rotatably within the stator 20 and fixed to a rotor shaft 11 aligned with the axial center. The polyphase AC electric motor 10 has performance suitable, for a hybrid automobile or an electric automobile, as a drive source similar to an internal combustion engine or as an in-wheel motor.

Figure 2:
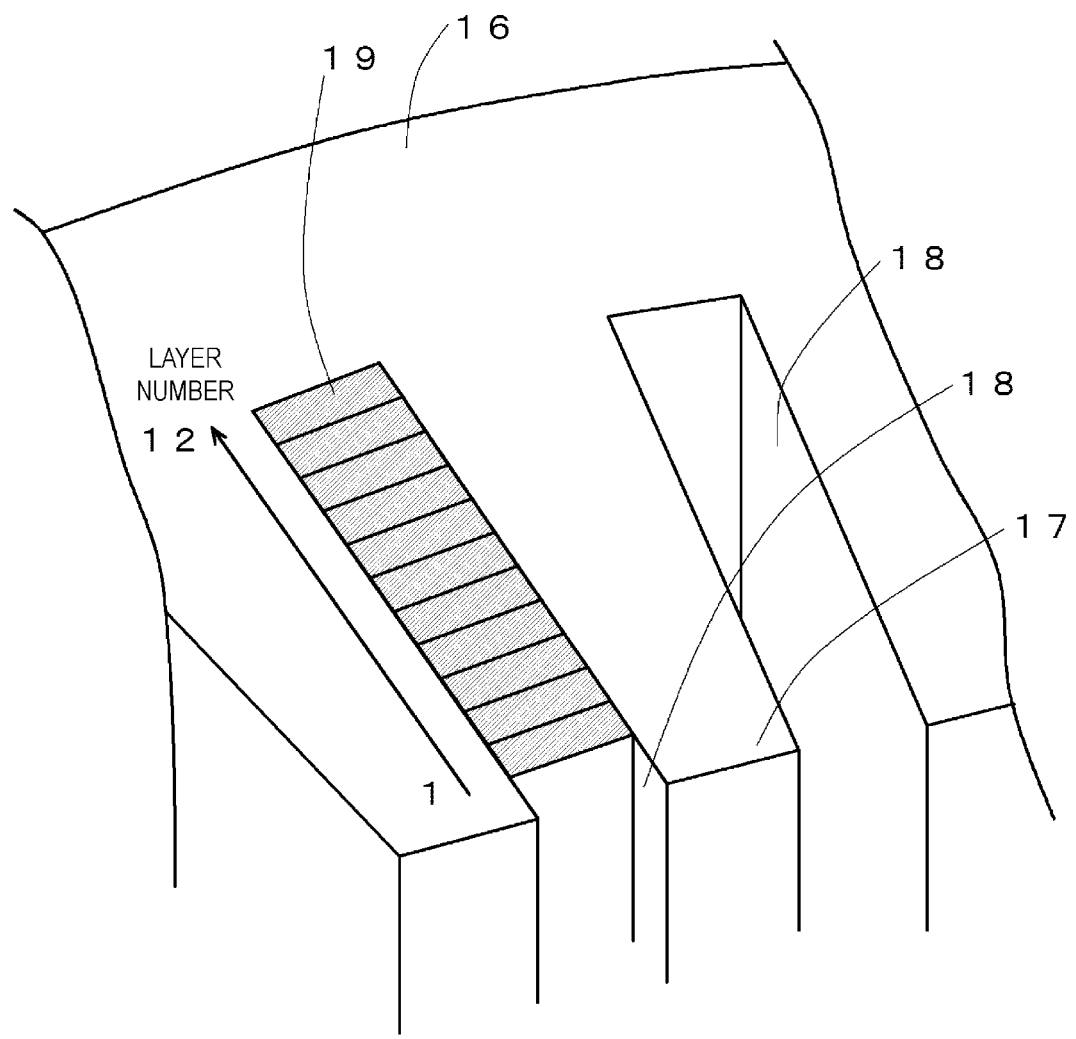
FIG. 2 is an enlarged drawing illustrating the surroundings of a slot illustrated in FIG. 1.

As illustrated in FIGS. 1 and 2, the stator 20 is constituted by a stator member 16 in which a plurality of teeth 17 is formed extending in a direction normal to the axial center such that an inner peripheral surface side of the teeth faces an outer peripheral surface of the rotor 15 via a gap g. Slots 18 are formed between the teeth 17. Partial conductors 19, which constitute windings of three phases for generating a magnetic flux to rotatably drive the rotor 15, internally housed so as to face the slots 18, are wound by distributed winding. The rotor 15 has an Interior Permanent Magnet (IPM) structure in which rotor members 12 and 13 are disposed around the periphery of the rotor shaft 11 and permanent magnets 14 are embedded in the rotor member 13.

Spaces between the teeth 17 constitute slots 18 through which the partial conductors 19 are wound to form the windings (coils). In the present embodiment, a configuration is given in which six of the teeth 17 face each of 8 sets (each set constituting one magnetic pole) of permanent magnets 14. In other words, the polyphase AC electric motor 10 is constructed such that six of the slots 18 correspond to one magnetic pole constituted from one pair of the permanent magnets 14. The polyphase AC electric motor 10 illustrated in FIGS. 1 and 2 is an IPM electric motor in which three phases are distribution wound on 8 poles and 48 slots, for which the front and back of the north and south poles of the permanent magnets 14 are alternated at each adjacent magnetic pole. Each slot is provided with a housing number of 12 layers stacked in the radial direction of the stator 20 for housing partial conductors 19 that constitute the windings. Note that the number of magnetic poles, the number of slots, and the housing number of layers stacked in the stator radial direction for housing the partial conductors of the windings provided in each slot differ by electric motor and, as such, are not limited to the example illustrated in FIGS. 1 and 2.

Additionally, in the present embodiment, the windings distribution wound on the teeth 17 of the stator 20 and housed in the 48 slots 18 consist of three phases, namely a U phase, a V phase, and a W phase, which are star connected at neutral points. The winding of each phase includes a plurality of the partial conductors 19, and is formed from a segment coil constituted by a terminal portion of a partial conductor extending from the slot 18 being joined to a terminal portion of an adjacent partial conductor. Additionally, the winding of each phase includes a first partial conductor that is an input side partial conductor connected to an input terminal; an nth (where n is a natural number greater than or equal to 2) partial conductor that is a final partial conductor connected to a neutral point, and second to n−1th partial conductors that are intermediate partial conductors connected between the first partial conductor and the nth partial conductor.

Figure 3:
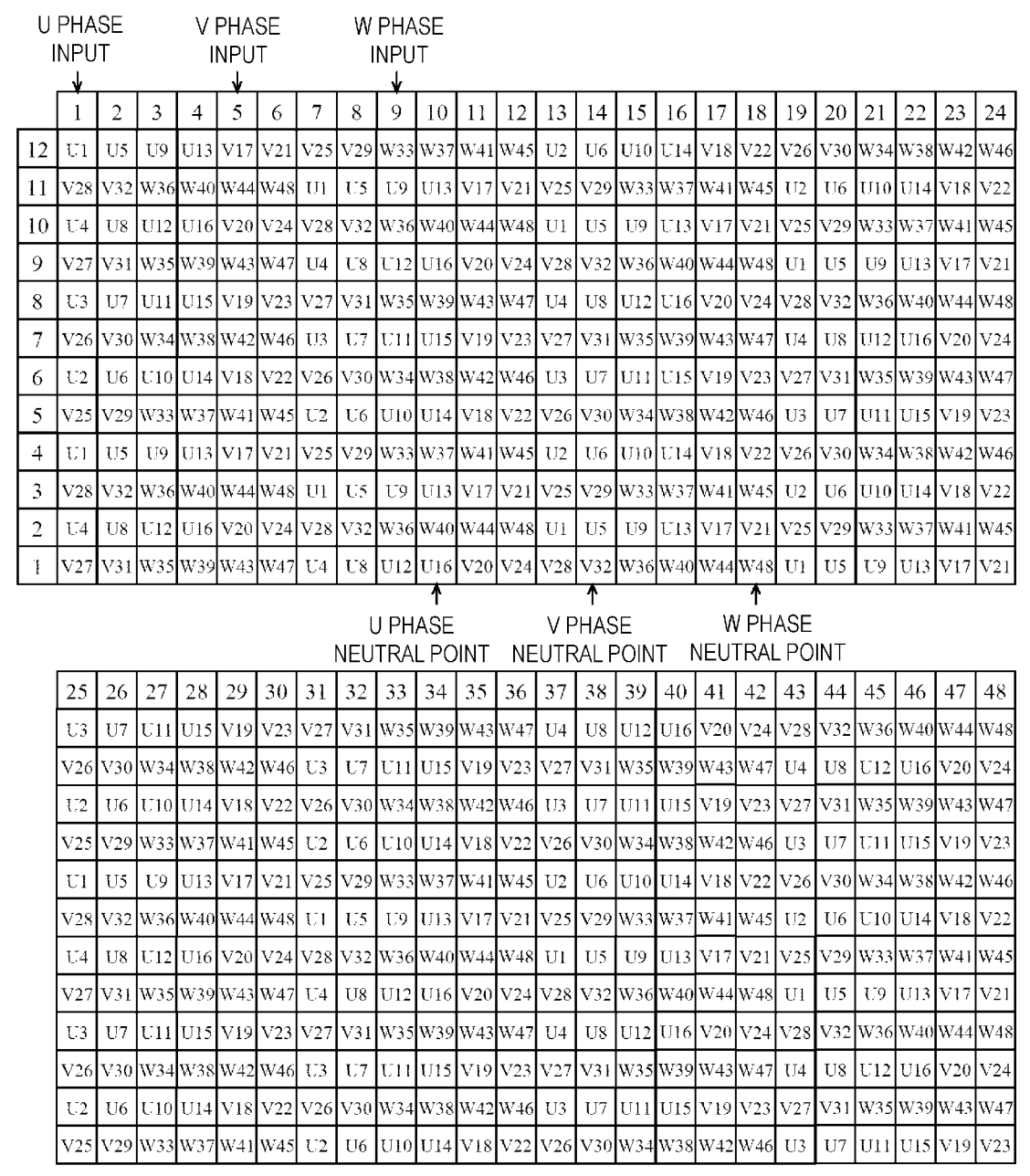

FIG. 3 is a table showing a mode of the partial conductors 19 housed in the slots 18 illustrated in FIG. 1. The numbers 1 to 48 across the top in FIG. 3 are slot numbers assigned to each of the slots 18, and the slot numbers are assigned to the slots 18 illustrated in FIG. 1 in the counter-clockwise direction from 1 to 48. Additionally, the numbers 12 to 1 down the side are layer numbers in which 1 is the layer on the rotor 15 side in the slot 18, and 12 is the layer innermost in the slot 18. Note that, in order to improve readability, FIG. 3 is divided into two tables, one including slots 1 to 24 and the other including slots 25 to 48. Additionally, the letters "U", "V", and "W" followed by a number from 1 to 48 recorded as table elements represent the partial conductors of the U, V, and W phases. For example, the U phase is constituted by partial conductors 1 to 16. U1 housed in the 12th layer of the 1st slot is the input side partial conductor and is connected to the neutral point via the 11th layer of the 7th slot (U1), . . . , the 1st layer of the 19th slot (U1), the 12th layer of the 13th slot (U2), . . . , and the 1st layer of the 10th slot (U16). The V phase is constituted by partial conductors 17 to 31. V17 housed in the 12th layer of the 5th slot is the input side partial conductor, and is connected to the neutral point via the 11th layer of the 11th slot (V17), . . . , the 1st layer of the 23rd slot (V17), the 12th layer of the 17th slot (V18), . . . , and the 1st layer of the 14th slot (V32). The W phase is constituted by partial conductors 32 to 48. W33 housed in the 12th layer of the 9th slot is the input side partial conductor, and is connected to the neutral point via the 11th layer of the 15th slot (W33), . . . , the 1st layer of the 27th slot (W33), the 12th layer of the 21st slot (W34), . . . , and the 1st layer of the 18th slot (W48).

Figure 4:
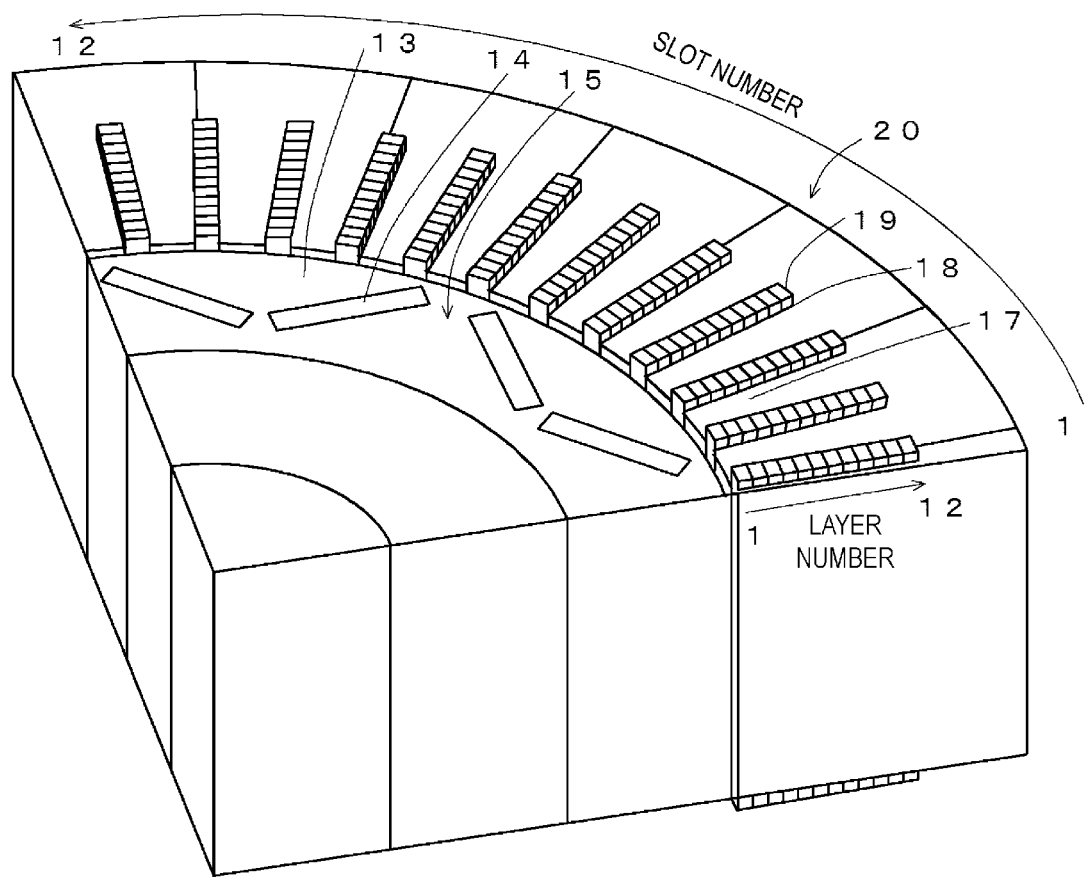
FIG. 4 is a drawing illustrating a ¼ model serving as an analysis subject.

Note that in the following, the overall structure of the electric motor used in the analysis is described using an example in which the ¼ model illustrated in FIG. 4 is used (specifically, where the number of slots is 12 and n=48). The example illustrated in FIG. 4 is a section corresponding to ¼ of the whole model illustrated in FIG. 1. Additionally, as illustrated in FIG. 4, the slots 18 are defined as 1st to 12th slots in the counter-clockwise direction; and, for the partial conductors 19 housed in the slots 18, the rotor 15 side is defined as the 1st layer, and the innermost portion of the slot 18 is defined as the 12th layer.

FIG. 5 is a table showing a mode of the partial conductors 19 housed in the slots 18 of the ¼ model of FIG. 4 according to a conventional method. In FIG. 5, the numbers 1 to 12 of the first row are slot numbers and represent the slots, namely the 1st to 12th slots, in order from the left side of FIG. 5, to which the partial conductors 19 correspond. Additionally, the numbers 1 to 12 of the first column are layer numbers and represent housing sections, among the plurality of housing sections in which the partial conductors housed in the slots 18 are stacked in the radial direction of the stator 20. The housing section innermost in the radial direction of the stator 20 is defined as the 1st layer and the housing section outermost in the radial direction of the stator 20 is defined as the 12th layer. Moreover, U1 to U48 represent the order, from the input side partial conductor U1 connected to the input terminal side, of the partial conductors of the U phase winding; represent intermediate partial conductors U2 to U47 connected in series to U1, and U48 that is a final partial conductor connected to the neutral point; and also represent positions at which these partial conductors are housed. In the same manner, V1 to V48 and W1 to W48 represent the input side partial conductors, intermediate partial conductors, and final partial conductors of the V phase and the W phase, respectively, and also the housing positions thereof.

In the conventional example illustrated in FIG. 5, the input side partial conductor U1 of the U phase is housed in the 12th layer of the 1st slot, the input side partial conductor V1 of the V phase is housed in the 12th layer of the 5th slot, and the input side partial conductor W1 of the W phase is housed in the 12th layer of the 9th slot. Additionally, the final partial conductor U48 of the U phase is housed in the 1st layer of the 10th slot, the final partial conductor V48 of the V phase is housed in the 1st layer of the 2nd slot, and the final partial conductor W48 of the W phase is housed in the 1st layer of the 6th slot. Furthermore, the coil end portions of the partial conductors U48, V48, and W48 are connected to neutral points. The intermediate partial conductor U2, connected to the input side partial conductor U1 housed in the 12th layer of the 1st slot, is housed in the 11th layer of the 7th slot, one magnetic pole pitch (6 slots) away and one layer inward from the input side partial conductor U1. The subsequent intermediate partial conductor U3 returns to the 1st slot and is housed in the 10th layer of the 1st slot, one layer farther inward. In this manner, the intermediate partial conductors are sequentially housed from the outermost 12th layer toward the innermost 1st layer, alternating between two housing sections separated by one magnetic pole pitch. Moreover, the intermediate partial conductor U13, connected to the intermediate partial conductor U12 housed in the innermost layer, returns to the outermost 12th layer and is housed in the 12th layer of the 2nd slot, offset one slot from the input side partial conductor U1 toward the intermediate partial conductor U2 in the same direction as the winding direction corresponding to the circumferential direction of the stator 20. Thereafter, the intermediate partial conductors are regularly housed in the same manner in the housing sections and the final partial conductor, namely U48, is housed in the 1st layer of the 10th slot. The V phase and the W phase are regularly wound and the partial conductors thereof are housed in the housing sections in the same manner.

Figure 6:
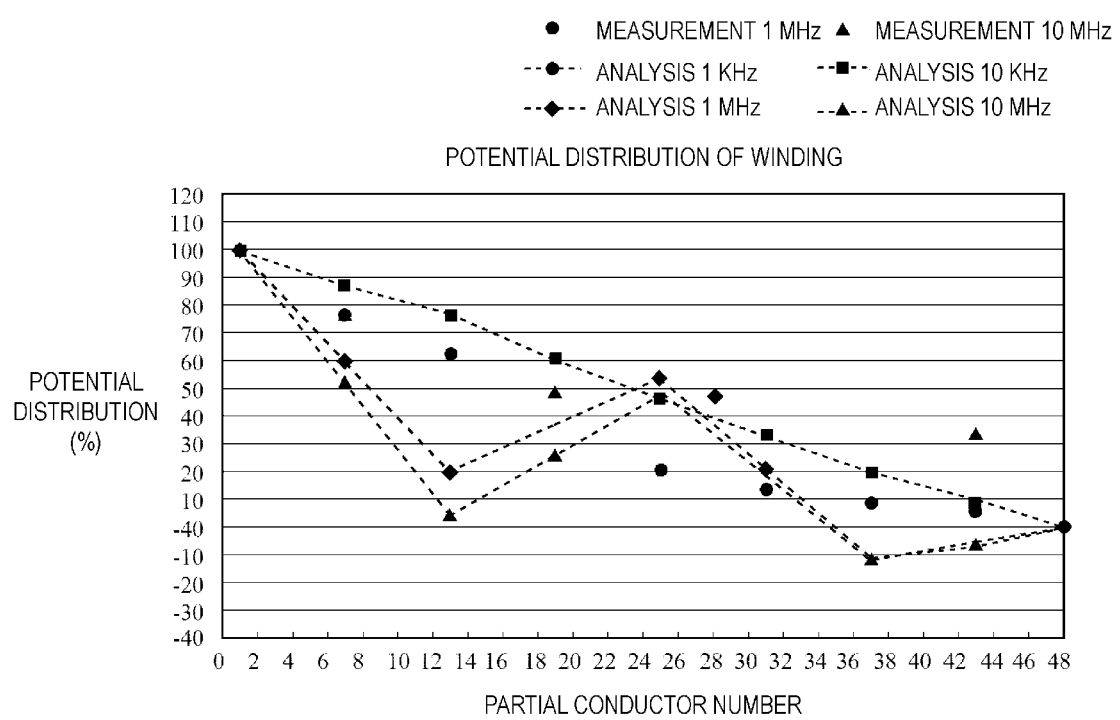
FIG. 6 is a chart showing potential distribution of the partial conductors in the housing mode shown in FIG. 5.

FIG. 6 shows analysis results and measurement results of the potential distribution from the input side partial conductor to the final partial conductor for a conventional winding wound in accordance with the method shown in FIG. 5. The frequency for the analysis and the measurement was set to 1 kHz, which is an assumed frequency during steady operation of the motor, and to 10 MHz which is an assumed frequency when surge voltage containing harmonics of several MHz due to high speed switching of the inverter is applied to the input terminal. Additionally, analysis results at 10 kHz and 1 MHz were recorded for reference. An 8-pole 48-slot electric motor was used for the measuring of the potential distribution. The potential measurement was performed by connecting voltage measurement probes to the neutral points and the partial conductors housed in the slot housing sections equivalent to the ¼ model, and applying AC voltage of predetermined frequencies to the input terminals and the neutral points.

The analyses of potential distribution at the predetermined frequencies on the ¼ model were performed using magnetic field analysis. The results of the analyses and the measurements shown in FIG. 6 are results for the U phase in a case where the phase angles are 90° for the U phase, 30° for the V phase, and 210° for the W phase. In FIG. 6, the partial conductors U1 to U48 are shown on the horizontal axis, and the input side potential of each partial conductor is shown as a ratio to the input potential on the vertical axis. When the frequency is set to 1 kHz, the potential decreases monotonically in both the analyses and the measurements from the input side partial conductor (U1) to the final partial conductor (U48). On the other hand, when the frequency is set to 10 MHz, the monotonous downward trend is not observed, and a potential distribution occurs in which extreme values exist at U13, U25, and U37. The positions where these extreme values occur correspond to the housing position of the 12th layer, which is the outermost layer in the radial direction of the stator 20.

Figure 7:
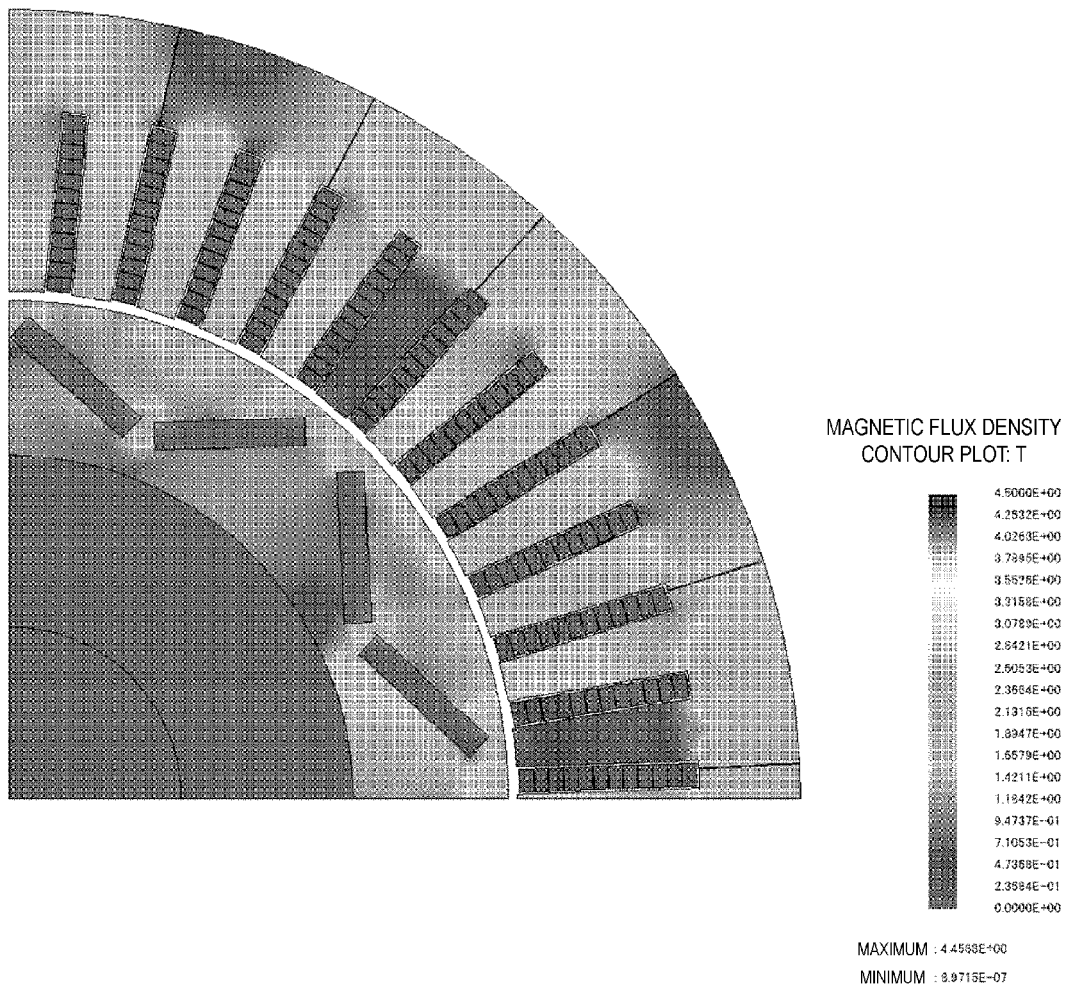
FIG. 7 is a drawing illustrating analysis results of magnetic flux density distribution when AC of 1 kHz is applied to the ¼ model illustrated in FIG. 4.
Figure 8:
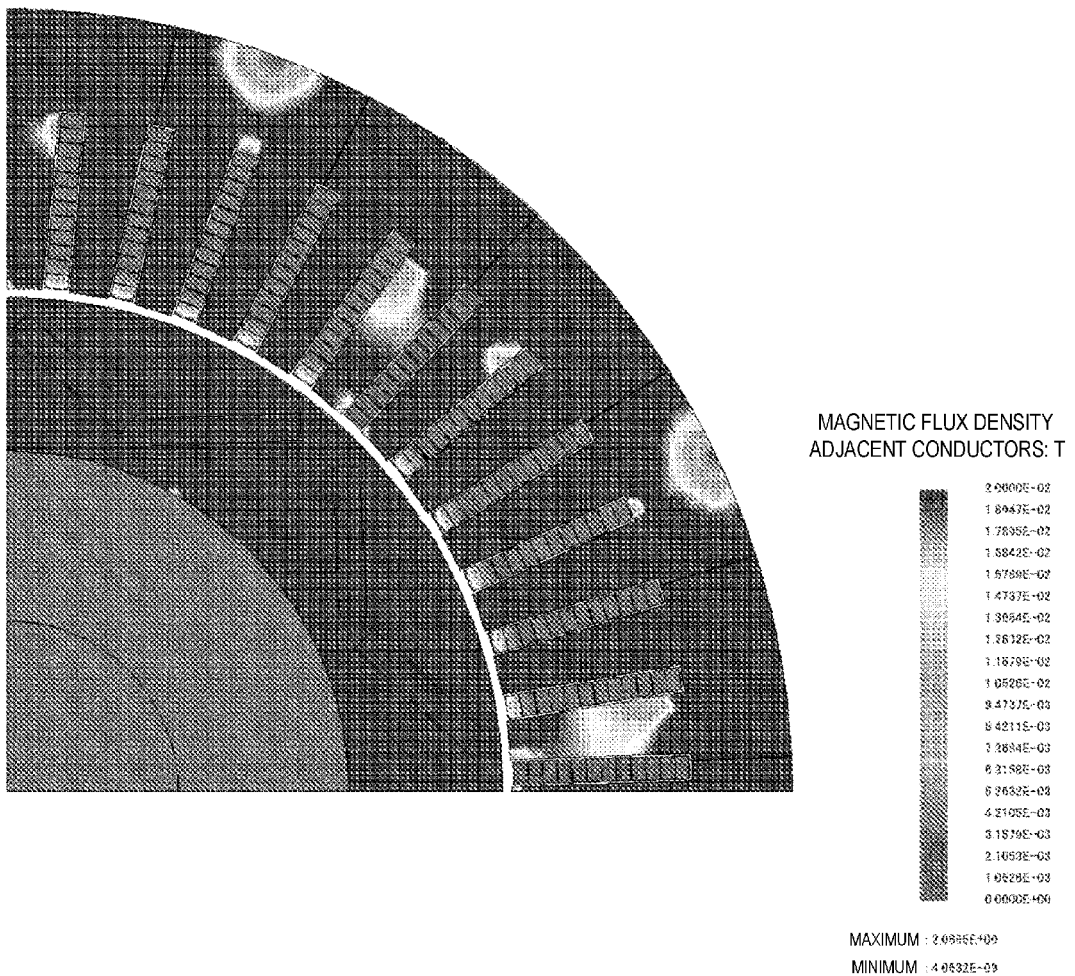
FIG. 8 is a drawing illustrating analysis results of magnetic flux density distribution when AC of 10 MHz is applied to the ¼ model illustrated in FIG. 4.

The magnetic flux density distribution was analyzed in order to investigate the cause of these extreme values occurring in the potential distribution. The results thereof are illustrated in FIGS. 7 and 8. The results of analyzing the magnetic flux density distribution in FIGS. 7 and 8 teach that in each slot, magnetic flux density is higher at the inner layers, particularly the innermost layer, than at the outer layers, and that this trend is more remarkable when the frequency is set to 10 MHz than when set to 1 kHz. This is thought to be caused by the permanent magnets 14 embedded in the rotor 15, and this hypothesis is further supported by the fact that the magnetic flux density is substantially uniform at 1 kHz and 10 MHz within the slots 18 where the permanent magnets 14 are not opposed. Additionally, it is thought that the magnetic flux density distribution becomes remarkable when the frequency is set to 10 MHz because the frequency is higher than 1 kHz, changes in the magnetic flux per unit time increase, and generated counter electromotive force increases. From the results of the analyses of the magnetic flux density distribution, it is thought that the increase in electromotive force due to the higher frequency is the cause of the partial conductors U13, U25, and U37 disposed in the innermost layer taking the extreme values in the potential distribution in the 10 MHz potential distribution results shown in FIG. 6.

In recent years, increasing the frequency of the switching of the inverter to improve efficiency has become more common. Thus, in cases where surge voltage containing harmonics of several MHz is applied to an input terminal, as shown in FIG. 6, a potential distribution in which extreme values occur at specific positions such as with 10 MHz shown in FIG. 6 is expected to occur in the winding, instead of a potential distribution that monotonously declines at 1 kHz, which is a steady state of electric motor, as shown in FIG. 6. Additionally, it is clear from FIG. 6 that with frequencies of the kHz order, monotonously declining potential distributions from the input side terminal to the neutral point are expressed, but from the measurements, it is clear that with frequencies of the MHz order, there is a tendency for potential distributions in which specific positions take extreme values to occur, such as that described above.

On the basis of the voltage distribution when high frequency surge voltage is applied, the present inventor investigated a structure whereby voltage generated between windings of different phases or the same phase decreases and partial discharge is suppressed. As described above, when the input frequency is a high frequency of the MHz order, a potential distribution occurs in which the potential of the partial conductors housed in the slot end innermost in the radial direction of the stator 20 take extreme values. Particularly, the potential of the intermediate partial conductor (U13 for the U phase) adjacent in the circumferential direction of the stator 20 to the input side partial conductor (U1 for the U phase) tends to decrease to near the neutral point potential. In other words, the potential difference of the input side partial conductor (U1 for the U phase) and the intermediate partial conductor (U13 for the U phase) adjacent in the circumferential direction of the stator 20 with other phases tends to decrease. Additionally, it is thought that the partial conductors (U10 to U16 and the like for the U phase) connected to that partial conductor (U13 for the U phase) will have potentials comparatively near the neutral point potential, and that potential differences with the other phases will be smaller. Moreover, the potential difference of the final partial conductor (U48 for the U phase) that is the intermediate coil connected to the neutral point side, and the intermediate partial conductors connected thereto (U45, U46, U47, and the like for the U phase) with the other phases can be reduced even at high frequencies.

A conductor housing method for windings according to the present embodiment in which the potential distribution characteristics at high frequencies described above are used and the input side partial conductor and the intermediate partial conductor disposed adjacent in the circumferential direction of the stator 20 to this input side partial conductor, the intermediate partial conductor connected to that partial conductor, the neutral point side partial conductor, or the partial conductors of windings adjacent to the partial conductor connected to the neutral point side partial conductor are housed is shown in FIG. 9. According to this housing method, the potential difference with the other phases is reduced, and partial discharge is suppressed. In the present embodiment, in the case of the ¼ model of the 8-pole 48-slot electric motor, the input side partial conductor U1 of the U phase is housed in the 12th layer of the 1st slot, the input side partial conductor V1 of the V phase is housed in the 12th layer of the 8th slot, and the input side partial conductor W1 of the W phase is housed in the 1st layer of the 3rd slot. Additionally, the final partial conductor U48 of the U phase that is connected to the neutral point is housed in the 1st layer of the 10th slot, the final partial conductor V48 of the V phase is housed in the 1st layer of the 11th slot, and the final partial conductor W48 of the W phase is housed in the 12th layer of the 12th slot. Thus, U48, V48, and W48 are connected to neutral points at the coil end portions thereof.

The intermediate partial conductor U2, connected to the input side partial conductor U1 housed in the 12th layer of the 1st slot, is housed in the 11th layer of the 7th slot, one magnetic pole pitch (6 slots) away and one layer inward from the input side partial conductor U1. The subsequent intermediate partial conductor U3 returns to the 1st slot and is housed in the 10th layer of the 1st slot, one layer farther inward. In this manner, the intermediate partial conductors are sequentially housed from the outermost 12th layer toward the innermost 1st layer, alternating between two housing sections separated by one magnetic pole pitch. Moreover, the intermediate partial conductor U13, connected to the intermediate partial conductor U12 housed in the innermost layer, returns to the outermost 12th layer and is housed in the 12th layer of the 2nd slot, offset one slot from the input side partial conductor U1 toward the intermediate partial conductor U2 in the same direction as the winding direction corresponding to the circumferential direction of the stator 20. Thereafter, the intermediate partial conductors are regularly housed in the same manner in the housing sections, and the final partial conductor, namely U48, is housed in the 1st layer of the 10th slot. As with the partial conductors of the U phase, the partial conductors of the V phase are also sequentially housed from the outermost layer side toward the innermost layer side in the radial direction of the stator 20, regularly alternating between two housing sections separated by one magnetic pole pitch. However, while the U phase is wound in the circumferential direction of the stator 20 from the 1st slot to the 4th slot, the V phase differs and is wound in the stator circumferential direction from the 8th slot to the 5th slot and the partial conductors are housed. Additionally, the partial conductors of the W phase are regularly housed in the housing sections in accordance with the same method used for the U phase and the W phase. While the input side partial conductors of the U phase and the V phase are sequentially housed from the outermost 12th layer toward the innermost 1st layer in the radial direction of the stator 20, alternating between two slots separated by one magnetic pole pitch, the input side partial conductor of the W phase is housed in the 1st layer that is innermost in the radial direction of the stator 20, and the W phase is wound and housed sequentially from the innermost side to the outermost side, from the 3rd slot to the 6th slot, between two slots separated by one magnetic pole pitch in the stator circumferential direction.

In the present embodiment, the partial conductors are housed according to the mode shown in FIG. 9. As such, in general, the potential difference between the input side partial conductor (U1, V1, or W1) where potential is highest and the partial conductor adjacent within the slot or the partial conductor adjacent in the radial direction or the circumferential direction of the stator 20 at the coil end portion outside the slot 18 can be reduced and partial discharge can be suppressed.

More specifically, in the present embodiment, a configuration is given in which the partial conductors taking the extreme values shown in FIG. 6 (e.g. partial conductors U13, U37, V13, V37, W13, and W37), the partial conductors connected before or after the partial conductors taking the extreme value (e.g. partial conductors U10 to U12, U14 to U16, V10 to V12, V14 to V16, W10 to W12, and W14 to W16), the output side partial conductors U48, V48, and W48, or the partial conductors connected to the output side partial conductors (e.g. U45 to U47, V45 to V47, and W45 to W47) are disposed as the partial conductors adjacent to the input side partial conductors U1, V1, and W1 in the slots 18 or at the coil ends outside the slots 18. As a result of this configuration, the potential difference between the input side partial conductors V1, U1, and W1 where potential is highest and the partial conductors adjacent within the slots 18 or outside the slots 18 can be suppressed.

Note that, in the example shown in FIG. 9, the partial conductors U13, V14, and W48 are disposed as the partial conductors adjacent within the slots 18 or outside the slots 18 to the input side partial conductor U1, the partial conductors U14, V13, and W12 are disposed as the partial conductors adjacent within the slots 18 or outside the slots 18 to the input side partial conductor V1, and the partial conductors U35, V12, and W13 are disposed as the partial conductors adjacent within the slots 18 or outside the slots 18 to the input side partial conductor W1.

Additionally, in the example shown in FIG. 9, the partial conductors U14, V13, V15, and W47 are disposed as the partial conductors adjacent within the slots 18 or outside the slots 18 to the partial conductor U2 connected to the input side partial conductor U1, and the partial conductors U15, V14, V16, and W46 are disposed as the partial conductors adjacent within the slots 18 or outside the slots 18 to the partial conductor U3 connected to the partial conductor U2. Likewise, the partial conductors U13, U15, V14, and W11 are disposed as the partial conductors adjacent within the slots 18 or outside the slots 18 to the partial conductor V2 connected to the input side partial conductor V1, and the partial conductors U14, U16, V15, and W10 are disposed as the partial conductors adjacent within the slots 18 or outside the slots 18 to the partial conductor V3 connected to the partial conductor V2. Likewise, the partial conductors U34, U36, V11, and W14 are disposed as the partial conductors adjacent within the slots 18 or outside the slots 18 to the partial conductor W2 connected to the input side partial conductor W1, and the partial conductors U33, U35, V10, and W15 are disposed as the partial conductors adjacent within the slots 18 or outside the slots 18 to the partial conductor W3 connected to the partial conductor W2.

Thus, a configuration is given in which the partial conductors adjacent within the slots 18 or outside the slots 18 to the input side partial conductors U1, V1, and W1 and the partial conductors U2, U3, V2, V3, W2, and W3 connected to the input side partial conductors U1, V1, and W1 can be selected as:

(1) the partial conductors U13, U37, V13, V37, W13, and W37 taking the extreme values shown in FIG. 6;
(2) the partial conductors U10 to U12, U14 to U16, V10 to V12, V14 to V16, W10 to W12, and W14 to W16 connected before or after the partial conductors taking the extreme value;
(3) the output side partial conductors U48, V48, and W48; or
(4) the partial conductors U45 to U47, V45 to V47, and W45 to W47 connected to the output side partial conductors.

As shown in FIG. 6, the partial conductors taking the extreme values are near the neutral point potential and, as such, the potential difference between the input side partial conductors U1, V1, and W1 and the partial conductors U2, U3, V2, V3, W2, and W3 connected thereto can be reduced.

Figure 10:
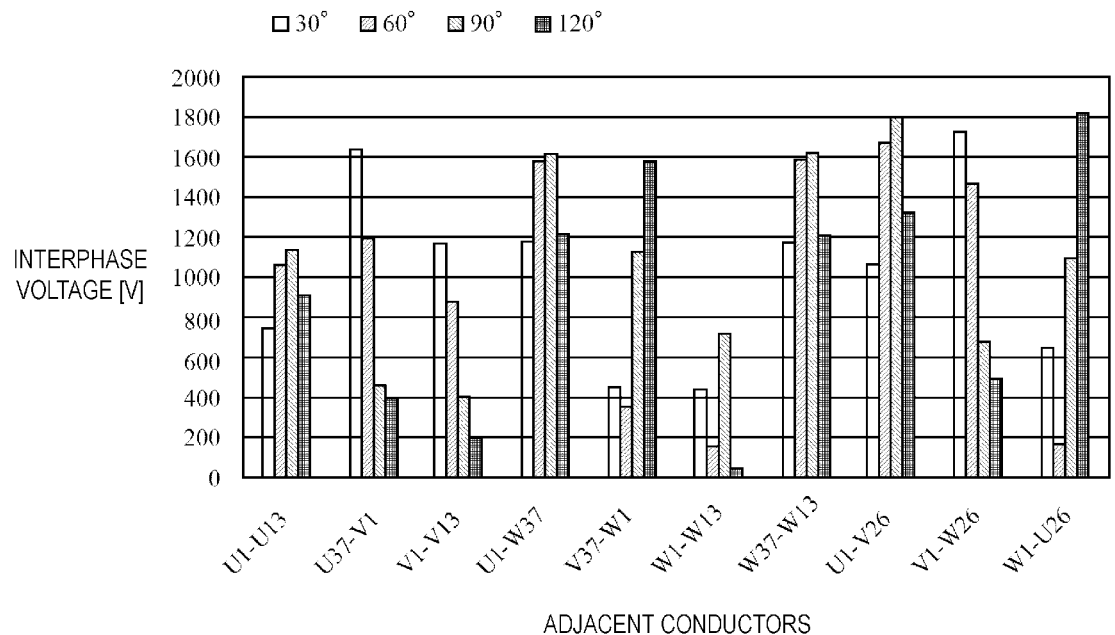
FIG. 10 is a chart showing interlayer voltage between adjacent partial conductors when AC of 1 kHz is applied to the ¼ model illustrated in FIG. 4.
Figure 11:
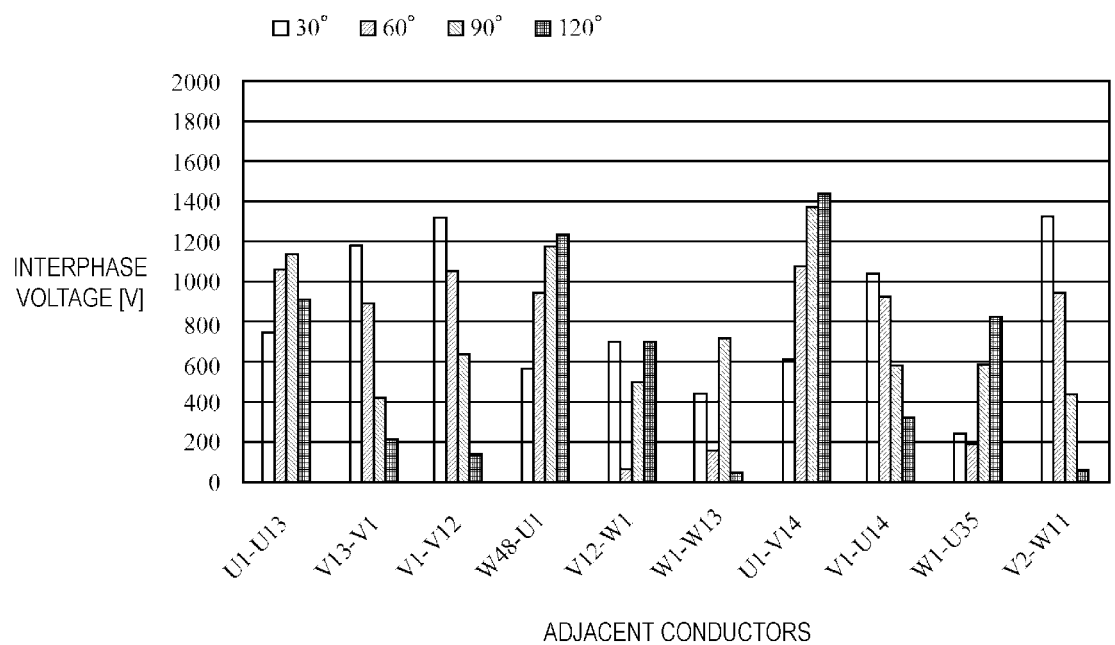
FIG. 11 is a chart showing interlayer voltage between adjacent partial conductors when AC of 10 MHz is applied to the ¼ model illustrated in FIG. 4.
Figure 12:
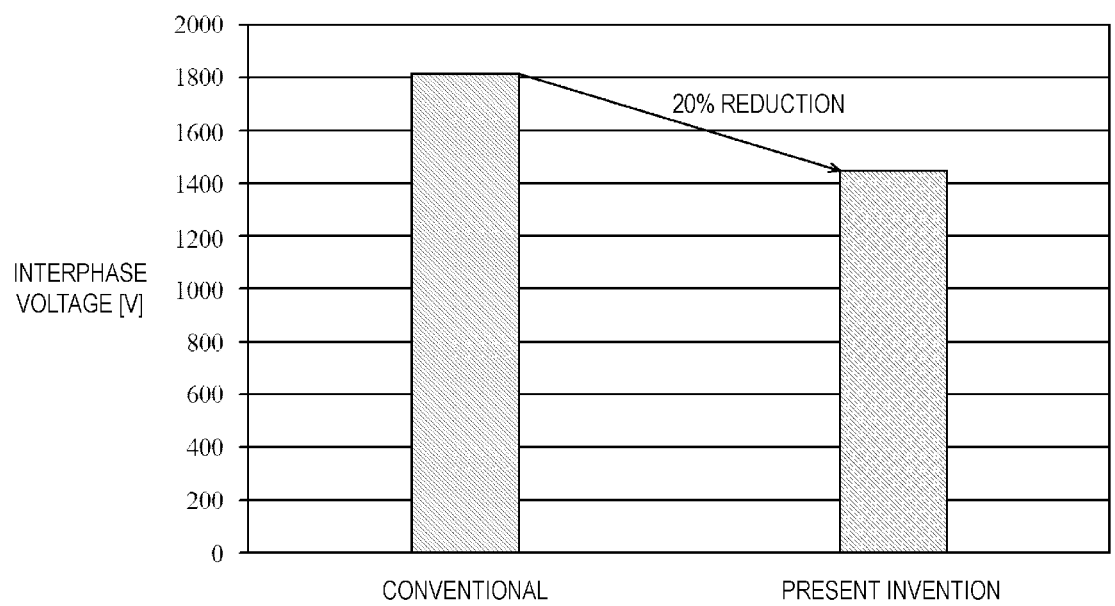
FIG. 12 is a chart showing comparison results of FIG. 10 and FIG. 11.

FIGS. 10 and 11 are charts for explaining the advantageous effects of the embodiment of the present invention. More specifically, FIG. 10 is a chart showing the potential differences between adjacent partial conductors in the housing method of partial conductors shown in FIG. 5; and FIG. 11 is a chart showing the potential differences between adjacent partial conductors in the housing method of partial conductors shown in FIG. 9. In FIGS. 10 and 11, the surge applied to the input terminal of each phase of the three-phase windings is 1200 V and the frequency is 10 MHz. FIGS. 10 and 11 show the results calculated for cases where the phase angle of the U phase is 30°, 60°, 90°, and 120°. Note that in these charts, interphase voltage is shown on the vertical axis and the subject adjacent conductors are shown on the horizontal axis. For example, in the bar chart on the left side of FIG. 10, the potential differences between the partial conductor U1 and the partial conductor U13 when the phase angle of the U phase is 30°, 60°, 90°, and 120° are shown. In a comparison of FIGS. 10 and 11, with the conventional slot housing method shown in FIG. 5, the maximum interphase voltage of the input side partial conductor is 1815 V between the input side partial conductor W1 of the W phase and the partial conductor U26 of the U phase when the phase angle of the U phase is 120°. In contrast, with the slot housing method of the present embodiment shown in FIG. 9, the maximum interphase voltage of the input side partial conductor is 1446 V between the input side partial conductor U1 of the U phase and the partial conductor V14 of the V phase when the phase angle of the U phase is 120°. From these results, it is clear that the maximum interphase voltage can be reduced about 20% compared to the conventional example, as shown in FIG. 12.

As described above, according to the present embodiment, any of the following are disposed as the partial conductors adjacent within the slots 18 or outside the slots 18 to the input side partial conductors U1, V1, and W1 where the potential is highest:

(1) the partial conductors taking the extreme values;
(2) the partial conductors connected before or after the partial conductors taking the extreme values;
(3) the output side partial conductors; or
(4) the partial conductors connected to the output side partial conductors.

As such, the potential differences between the input side partial conductors U1, V1, and W1 and the adjacent partial conductors can be reduced. Additionally, the same partial conductors are disposed as the partial conductors adjacent to the partial conductors U2 to U3, V2 to V3, and W2 to W3 connected to the input side partial conductors U1, V1, and W1. As such, the potential differences between the partial conductors U2 to U3, U2 to V3, and W2 to W3 and the partial conductors adjacent thereto can be reduced. As a result, partial discharge can be effectively suppressed. Additionally, voltage between coils of the same phase or coils of different phases can be reduced, partial discharge can be suppressed, and manufacturing can be facilitated without reducing the space factor, even in cases where an inverter surge, which contains harmonics caused by higher frequencies resulting from the high speed inverter switching, is applied to the input terminals.

(D) Description of Alternate Embodiment

It goes without saying that the embodiment described above is only an example and the present invention is not limited to the embodiment as described above. For example, in the embodiment described above, the number of slots is set to 48 and the number of layers is set to 12. However, obviously, numbers other than these may be used.

Additionally, the arrangement shown in FIG. 9 is an example, and it goes without saying that other arrangements may also be used. For example, in the example shown in FIG. 9, only the V phase is wound in the reverse direction of the stator 20, but configurations are possible in which the phases other than the V phase are wound in the reverse direction, or all of the phases are wound in the same direction. Additionally, in the example shown in FIG. 9, only the W phase, that is, only the input side partial conductor W1 is disposed in the 1st layer, but configurations are possible in which the input side partial conductors of the phases other than the W phase are disposed in the 1st layer, the input side partial conductors of all of the phases are disposed in the 1st layer or the 12th layer, or the input side partial conductor of any one phase is disposed in the 12th layer.

Additionally, in the embodiment described above, the arrangement of the partial conductors is determined using the extreme values in a case where high frequency power of 10 MHz is applied, but the present invention is not limited to 10 MHz and it is sufficient that extreme values corresponding to the switching frequency of the inverter are calculated and the arrangement of the partial conductors is determined in accordance with the calculated extreme values.

Additionally, in the embodiment described above, a configuration is given in which the final partial conductors, namely the partial conductors U48, V48, and W48 and the partial conductors U45 to U47, V45 to V47, and W45 to W47 connected prior to the final partial conductors are disposed adjacent to the input side partial conductors U1, V1, and W1 or the partial conductors U2 to U3, V2 to V3, and W2 to W3 connected to the input side partial conductors. However, in some cases, the final partial conductors, namely the partial conductors U48, V48, and W48 and the partial conductors U45 to U47, V45 to V47, and W45 to W47 connected prior to the final partial conductors may be omitted from the partial conductors to be adjacently disposed. Specifically, the technical concept of the present invention is that partial conductors exist that take extreme values near the neutral point voltage when high frequency voltage is applied, as shown in FIG. 6, and, as a result, partial discharge is suppressed by disposing these partial conductors or the partial conductors connected to these partial conductors adjacent to the input side partial conductors or the partial conductors connected to the input side partial conductors. Therefore, the partial conductors connected to the partial conductor that is the final partial conductor or prior to the final partial conductor need not be treated as partial conductors to be adjacently disposed but are not always omitted from the partial conductors to be adjacently disposed. In other words, the optimal arrangement may be configured depending on the type of electric motor.

Additionally, in the embodiment described above, a configuration is given in which, when the partial conductors of each phase taking the extreme values are defined as ath partial conductors, the partial conductors of each phase corresponding to the a−3th to the a+3th partial conductors are disposed adjacent to the first to third partial conductors of each phase. The range is set to the a−3th to the a+3th because the a+4th and the a−4th partial conductors have a potential of about 75% of the input side partial conductor at 10 MHz (FIG. 6) and, even without taking the arrangement into consideration, attenuation of at least 20% is obtained. However, depending on application and the frequency, partial conductors in a narrower range (e.g. the partial conductors in a range of the a−2th to the a+2th or in a range of the a−1th to the a+1th) may be used. Of course, the same holds true for the first to third partial conductors to which the partial conductors are to be adjacently disposed and, depending on the application, a narrower range (e.g. the first and second partial conductors or only the first partial conductor) may be used.

REFERENCE SIGNS LIST

10 Polyphase AC electric motor
11 Rotor shaft
12, 13 Rotor member
14 Permanent magnet
15 Rotor
16 Stator member
17 Teeth
18 Slot
19 Partial conductor
20 Stator

The invention claimed is:
1. A polyphase AC electric motor, comprising:
a stator in which windings of different phases are distribution wound and star-connected, the polyphase AC electric motor being driven by an inverter; wherein the winding of each phase includes:
a first partial conductor that is an input side partial conductor connected to an input terminal,
an nth partial conductor that is a final partial conductor connected to a neutral point, where n is a natural number greater than or equal to 2, and
second to n-1th partial conductors that are intermediate partial conductors connected between the first partial conductor and the nth partial conductor;
a partial conductor disposed adjacent to the first partial conductor of each phase within the stator, or a partial conductor including a coil end portion disposed adjacent to a coil end portion where the first partial conductor extends out of a slot, corresponds to a partial conductor described in any of (1) to (2):
(1) of the intermediate partial conductors, an ath partial conductor of the same phase or a different phase where voltage takes an extreme value when AC voltage is applied from the inverter, where a is a natural number greater than or equal to 2;
(2) any of an a−3th to a−1th partial conductors of the same phase or a different phase, or any of an a+1th to a+3th partial conductors of the same phase or a different phase connected to the intermediate partial conductor taking the extreme value; and
wherein the partial conductor that takes the extreme value is a bth partial conductor of the same phase or a different phase adjacent in a circumferential direction of the stator to a slot end in which the first partial conductor of each layer is housed, where n is a natural number greater than or equal to 2, any of a b−3th to b−1th partial conductors connected to the partial conductor, or any of a b+1th to b+3th partial conductors connected to the partial conductor.

2. The polyphase AC electric motor according to claim 1, wherein:
a partial conductor disposed adjacent within the stator to the second partial conductor or the third partial conductor of each phase, or a partial conductor including a coil end portion disposed adjacent to a coil end portion where the first partial conductor or the third partial conductor extends out of the slot corresponds to a partial conductor described in any of the (1) to (2).

3. The polyphase AC electric motor according to any one of claims 1 to 2, wherein:
the first partial conductor of at least one phase of the first partial conductors of the plurality of phases is disposed at a first end portion in a radial direction of the stator; and
the first partial conductors of the other phases are disposed at a second end portion in the radial direction of the stator.

4. The polyphase AC electric motor according to any one of claims 1 to 2, wherein:
winding directions, with respect to the circumferential direction of the stator, of the windings of different phases are all the same direction.

5. The polyphase AC electric motor according to any one of claims 1 to 2, wherein:
at least one winding direction, with respect to the circumferential direction of the stator, of the windings of different phases is an opposite direction.

6. The polyphase AC electric motor according to claim 1 or 2, wherein:
the partial conductor including the coil end portion disposed adjacent to the coil end portion where the first partial conductor extends out of the slot corresponds to a partial conductor described in any of (1) to (2):
(1) a b−1th partial conductor or a b+1th partial conductor connected before or after the bth partial conductor;
(2) any of a n−1th to nth partial conductors of the same phase or a different phase.

7. The polyphase AC electric motor according to claim 3, wherein:
winding directions, with respect to the circumferential direction of the stator, of the windings of different phases are all the same direction.

8. The polyphase AC electric motor according to claim 3, wherein:
at least one winding direction, with respect to the circumferential direction of the stator, of the windings of different phases is an opposite direction.

* * * * *